June 9, 1942.   C. W. CUNO   2,285,497
METHOD AND APPARATUS FOR FORMING TUBULAR ARTICLES
Filed Nov. 30, 1938
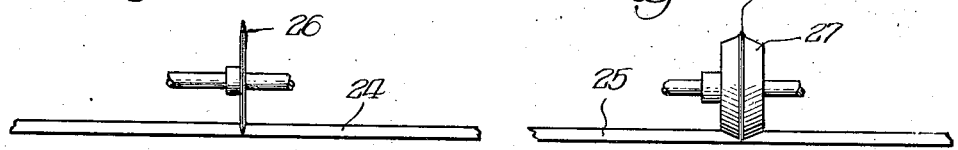
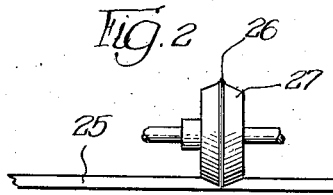
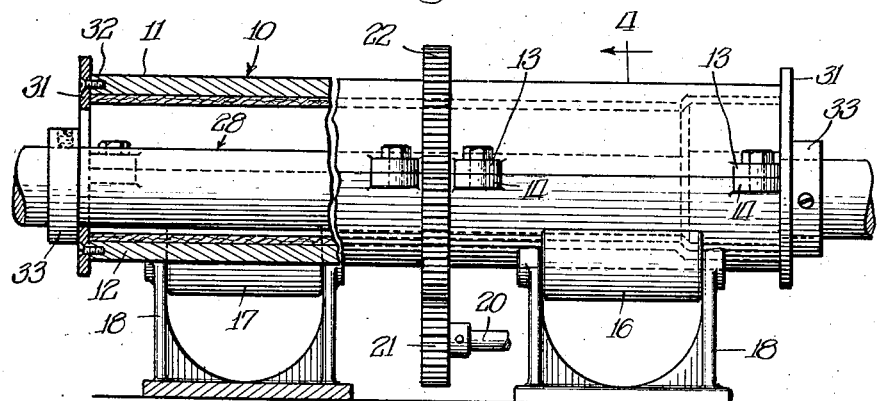
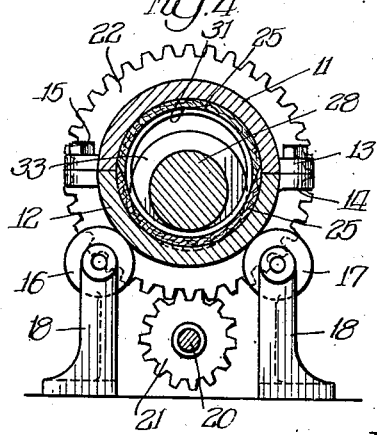
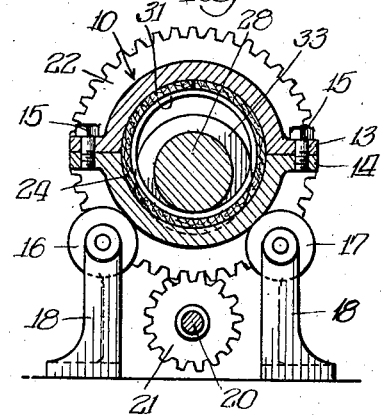
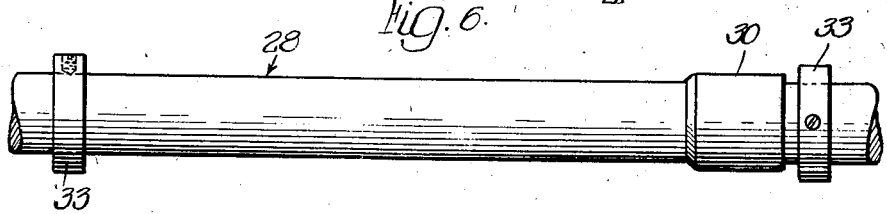
INVENTOR.
Charles W. Cuno,
BY
ATTORNEY.

Patented June 9, 1942

2,285,497

UNITED STATES PATENT OFFICE 2,285,497

METHOD AND APPARATUS FOR FORMING TUBULAR ARTICLES

Charles W. Cuno, Wilmington, Ill., assignor to The Lehon Company, Chicago, Ill., a corporation of Illinois Application November 30, 1938, Serial No. 243,136

5 Claims. (Cl. 25—30)

The invention relates to a new and improved method and apparatus for manufacturing tubular articles such as pipe, pillars, ornamental columns and the like from asbestos-cement or similar plastic or laminated material.

Heretofore in the manufacture of tubular articles a mixture of asbestos and cement was formed in the usual manner and the same was rolled directly onto a steel rod or mandrel. The exterior of the tube or article on the rod was shaped by pressure applied by outer rolls and belts. The steel rod comprising the original mandrel on which the material was formed was eventually removed and a wooden mandrel inserted in its place in order that the tubular article may set in approximately cylindrical form. The removal of the original mandrel was difficult and specially constructed machinery was required for the operation.

It is an object of the present invention to provide an improved method of forming tubular articles which will not require special machinery for removing the mandrel and which will produce a more accurately shaped article than was heretofore possible.

A further object is to provide improved apparatus for carrying out the present method which will be simple in construction, will not easily get out of order and which will fulfill all other requirements of service.

Another object is to provide a new and improved method for the purposes described wherein the material can be worked to better advantage so that the resulting article will have greater strength.

A further ob'ect is to provide an improved method of forming tubular articles with either a butt joint or a lap joint and wherein the joint in either case may be parallel to the length of the pipe or spiral.

For the purposes of the present invention a sheet of cement-asbestos or other plastic material may be formed in a manner known to the prior art or the ingredients may be mixed in the usual manner such as by rotating the same in a revolving drum and adding predetermined amounts of liquids. The essential feature of the mixing operation is that the materials must be mixed with the proper quantity of liquid to give the desired coherence when subsequently spun in a revolving mold but not wet enough to form a slurry which would be free flowing. Another method consists in placing the dry ingredients directly into the rotating mold and then adding a liquid while rotation of the mold continues until a more or less coherent layer of the mixture adheres to the walls. In the case where a sheet of material is first prepared this is then cut to the desired width and length and inserted within a revolving form or mold. In both cases a mandrel of special shape, determined by the article to be formed, is inserted within this mold, which is then rotated at a high speed. In the present method of forming tubular articles the mold confines and shapes the outer wall of the article while the interior thereof is worked by the mandrel. This working or pressing of the materials, which takes place while the mold is rotating, produces a more compact wall and therefore a stronger article than has heretofore been the case. Also the mandrel has a homogenizing effect on the plastic mixture.

With these and various other objects in view, the invention may consist of certain novel features of construction and operation, as will be more fully described and particularly pointed out in the specification, drawing and claims appended hereto.

In the drawing which illustrates an embodiment of the device and wherein like reference characters are used to designate like parts—

Figure 1 is a front elevational view showing the knife used for cutting sheets of plastic material for a butt joint;

Figure 2 is a front elevational view of another form of knife used in cutting sheets of plastic material for a lap joint;

Figure 3 is a side elevational view, parts being shown in section, of the revolving drum and associated mandrel for forming the tubular articles in accordance with the invention;

Figure 4 is a vertical sectional view taken substantially along line 4—4 of Figure 3;

Figure 5 is a vertical sectional view similar to Figure 4 but showing the tubular article within the drum as having a butt joint; and Figure 6 is an elevational view of the mandrel used in conjunction with the revolving drum of Figure 3.

Referring to the drawing, particularly Figures 3 and 4, a revolving drum or mold is provided, indicated by numeral 10, which may be constructed of any suitable metal and which is accurately machined on both its inside and outside surfaces. The interior of the mold is shaped according to the particular article to be formed and in the embodiment shown in the drawing, Figure 3, one end is slightly enlarged in diameter in order to produce pipe having a bell end. The drum or mold may be separated longitudinally in order to facilitate removal of the completely formed article and for said purpose the present mold consists of an upper cylindrical portion 11, and a lower similarly shaped portion 12. Each portion adjacent its edges is provided with lugs 13 and 14, respectively, and the portions are securely held together by screws 15 which pass through the lugs 13 on the upper cylindrical portion and have threaded engagement with lugs 14 of the lower portion 12. By tightening the screws the two sections of the present mold or drum are securely held in assembled relation. The exterior surface of the drum between the lugs is free of obstructions and the same is supported at these points in a manner permitting rotation thereof. The supporting means consists of spaced rollers 16 and 17 having contact with the respective ends of the drum and each roller is suitably journalled for rotation by an upright standard 18. The drum is rotated by any suitable source of power which is applied to shaft 20 having the pinion 21 fixed thereto. This pinion meshes with a large gear 22 encircling and suitably secured to the exterior of the drum. The gear is split diametrically to coincide with the line of separation between the upper and lower portions of the drum.

The equipment above described may be used in connection with preformed sheets of plastic material such as a cement-asbestos mixture or the said drum may constitute a receptacle for directly receiving the dry ingredients of the plastic mixture and wherein they are mixed with liquid to form a mass that can be worked to assume the shape of the mold. When the use of preformed plastic sheets is contemplated said sheets must first be cut to the proper width. In Figures 1 and 2 preformed sheets, indicated by numerals 24 and 25, are shown as being cut by circular cutting blades 26. In Figure 1 the blade only is used and this cuts the sheet with a sharp square edge which is satisfactory for purposes of a butt joint. In Figure 5 the said sheet of material, having been cut by a circular blade or other equivalent cutting means, is shown in position within the mold. This illustrates a butt joint since the two side edges of the sheet contact. When a lap joint is desired the circular cutting blade 26 has associated therewith auxiliary pressure rollers 27, as shown in Figure 2. Said rollers are characterized by a conical exterior shape and which press the material during the cutting operation to form bevelled edges. Two sheets having their respective edges bevelled may be associated within the rotatable mold, as shown in Figure 4, to form lap joints.

Following the initial operation on the sheet as above described, it is then inserted within the rotatable mold, which, of course, is brought to rest for the purpose. In most cases it will be necessary to remove the screws 15 and separate the upper portion 11 from the lower portion 12 in order to facilitate insertion of the sheet or sheets within the drum. A mandrel of the desired exterior shape is then inserted within the mold for the purpose of forming the interior surface of the article. The mandrel for association with the mold of Figure 3 is indicated by numeral 28 and the same may be formed of any suitable metal, being preferably solid throughout its extent so as to provide the necessary weight for properly working the plastic material within the mold during rotation thereof. The mandrel 28, as better shown in Figure 6, has one end enlarged in diameter as at 30. This mandrel, therefore, has a shape conforming essentially to the interior shape of the mold and is used to produce "bell end" pipe. For producing tubular articles of a different shape the mold and also the mandrel will be constructed for that particular purpose. It is essential that the mandrel conform in some degree concentrically with the inside shape of the mold and that the mandrel be somewhat smaller than the interior diameter of the mold so that it may rest loosely within the same. Following insertion of the mandrel the end gates 31, which are in the form of rings, are suitably secured by screws 32 or the like to the drum 10. The function of the end gates is to control the wall thickness of the article being formed in the mold. This comes about by reason of the fact that the opening in the end gates provides a support for the mandrel, allowing the mandrel to revolve freely as the drum revolves. The guides 33 are then secured to the respective ends of the mandrel to properly position the same longitudinally of the mold and the latter is then rotated at high speed.

During the operation of rotating the mold the mandrel in seeking the lowest point within the same will be caused to revolve, thereby supplying the needed pressure to work the plastic material and uniformly distribute the same over the interior surface of the mold. This working has a homogenizing action on the plastic material and also provides a smooth interior surface for the article being formed. The weight or pressure applied on the article is further increased by centrifugal force due to the rotation of the mold. However, in those cases where the weight of even a relatively large mandrel would not be sufficient, the same may be weighted at its ends or the mandrel itself may be driven to thereby give added pressure and also a positive rolling and homogenizing effect.

For forming large pipe or where the inner and outer coating is to be of different compositions, or where the pipe is to have a core of different material, the second embodiment of the present method is preferred. In this the dry ingredients are introduced directly into the mold and sufficient liquid is added to form a plastic mass which will adhere to the side walls. Care must be taken in the addition of the liquid so that a slurry is not produced with consequent free flowing of the mass and segregation. Following this mixing of the plastic material the mandrel is inserted within the mold and the rotation continued. As above pointed out, the mandrel may be positively driven in order to obtain improved homogenity and density. A second or third coat formed of different ingredients may be applied to the article within the mold in like manner. If it is desired to strengthen the pipe by reinforcements, wire mesh or parallel rods may be inserted into the mold and rolled into the partially formed pipe, after which a slurry of the plastic mass or a preformed sheet of the same may be added to completely cover the reinforcements.

After the pipe has been formed the mandrel is withdrawn and the mold set away until the cement or binder has set. After this has taken place the mold can be separated into its two semi-cylindrical portions and the finished pipe or other article removed.

What is claimed is:

1. The method of forming tubular articles from a plastic cement-asbestos material, which consists in forming a layer of said material on the inside of a cylindrical mold to completely cover the mold surface thereof, inserting a mandrel in an axial direction within said mold, said mandrel having a diameter less than the internal diameter of the article to be formed and which conforms in some degree to the inner shape of the mold, supporting the mandrel by the respective ends of the mold to space the mandrel from the inside surface of the same, and rotating the mold, whereby the mandrel will have free rolling movement on the inside periphery of said ends to produce a rolling action on the plastic layer to thereby shape the article and produce the desired wall thickness.

2. The method of forming tubular articles from a plastic cement-asbestos material, which consists in forming a layer of said material on the inside of a cylindrical mold to completely cover the mold surface thereof, inserting a mandrel longitudinally within said mold and supporting the mandrel by the respective ends of the mold only to space the mandrel from the inside surface of the same, said mandrel having a diameter less than the internal diameter of the article to be formed and which conforms in some degree to the inner shape of the mold, and producing relative rotation between the mandrel and the mold, whereby the mandrel will have free rolling movement on the inside periphery of said ends to produce a rolling action on the plastic layer, said mandrel forming a smooth interior surface and by reason of its weight and rolling action producing an article having a dense, homogeneous wall structure.

3. The method of forming tubular articles from a plastic cement-asbestos material, which consists in introducing the ingredients of said material in dry form into a cylindrical mold, the interior of which is shaped for the particular article to be formed, adding a liquid in predetermined amounts, working the ingredients to form a plastic mass by rotating the mold, inserting a mandrel longitudinally within the mold having a diameter less than the internal diameter of the article to be formed and which conforms in some degree to the inner shape of the mold, supporting the mandrel by the respective ends of the mold to space the mandrel from the inner surface of the same, and producing relative rotation between the mandrel and mold, whereby the mandrel will have free rolling movement on the inside periphery of said ends to produce a rolling action on said plastic layer to thereby shape the article and produce the desired wall thickness.

4. In apparatus for forming tubular articles from plastic material, in combination, a cylindrical mold including an upper semi-cylindrical portion and a lower portion of similar shape, releasable means located longitudinally of the mold for securing said portions in assembled relation, means engaging the exterior of said mold and supporting the same for rotation, rings secured to the respective ends of said cylindrical mold, and a mandrel having a diameter less than the internal diameter of the mold and conforming in some degree to the inner shape of said mold, said mandrel having location within the mold in which position said mandrel is supported only by said rings which permit bodily rolling of the mandrel within the mold.

5. In apparatus for forming tubular articles from plastic material, in combination, a cylindrical mold including an upper semi-cylindrical portion and a lower portion of similar shape, releasable means located longitudinally of the mold for securing said portions in assembled relation, means engaging the exterior of said mold and supporting the same for rotation, rings secured to the respective ends of said cylindrical mold, a mandrel within said cylindrical mold, said mandrel having a diameter less than the internal diameter of said mold and being supported by said rings in spaced relation with said inside surface of said mold, and means for rotating said mold, said rings comprising the only support for the mandrel and which permit bodily rolling of the mandrel within the mold.

CHARLES W. CUNO.